United States Patent [19]

Moraw et al.

[11] 4,373,038

[45] Feb. 8, 1983

[54] ASBESTOS-FREE FRICTION MATERIAL

[75] Inventors: Klaus Moraw, Duisburg; Hans-Günther Paul, both of Duisberg, Fed. Rep. of Germany

[73] Assignee: Rutgerswerke Aktiengesellschaft, Frankfurt am Main, Fed. Rep. of Germany

[21] Appl. No.: 307,628

[22] Filed: Oct. 1, 1981

[30] Foreign Application Priority Data

Oct. 16, 1980 [DE] Fed. Rep. of Germany ....... 3039089
Oct. 21, 1980 [DE] Fed. Rep. of Germany ....... 3039607

[51] Int. Cl.$^3$ .................... C08L 9/06; C08L 61/06; C08L 63/00
[52] U.S. Cl. ................................. 523/156; 523/155; 524/440; 524/444; 524/447; 524/449; 524/456
[58] Field of Search ............... 523/155, 156; 524/447, 524/449, 456, 494, 440, 444

[56] References Cited

U.S. PATENT DOCUMENTS 4,130,537 12/1978 Bohrer ............................... 523/156
4,145,223 3/1979 Iwata ................................. 523/156
4,197,223 4/1980 Bartram ............................. 523/156

Primary Examiner—Lewis T. Jacobs
Attorney, Agent, or Firm—Hammond & Littell, Weissenberger and Muserlian

[57] ABSTRACT

An asbestos-free friction material useful for brake linings, clutches, etc. comprising 5 to 25% by weight of a hardenable binder or binder mixture, 1 to 70% by weight of a reinforcing fibrous material and conventional additives, the said reinforcing material consisting essentially of 2.5 to 12% by weight of aramide fibers, 6 to 25% by weight of mineral fibers and 16 to 36% by weight of steel fibers and optionally 5 to 20% by weight of powdered mica.

9 Claims, No Drawings

ASBESTOS-FREE FRICTION MATERIAL

STATE OF THE ART

The present commercial friction materials for clutches and brakes are usually produced with asbestos fibers as a reinforcing material and attempts are being made to find a suitable replacement for asbestos fibers due to environmental and possible carcinogenic problems of asbestos and a possible shortage of asbestos raw materials. Reinforcing materials such as fibers with a mineral, ceramic, glass or organic base have been used to replace asbestos in friction linings but they lack the desirable physical properties of asbestos linings. The search for friction materials having substantially superior qualities than the asbestos linings has continued because industrial demands on friction linings have constantly increased with respect to thermal and mechanical strength, wear resistance, braking deceleration and stability delay with rising drum temperatures and increasing speed.

The selection of certain fibers made it possible to develope friction linings with great improvements in certain properties. For example, commonly assigned U.S. patent application Ser. No. 307,627 filed on even date herewith describes the use of diabase fibers as a reinforcing material in friction linings to obtain much higher wear values for the brakes or drums. DOS No. 2,727,541 describes using aramide fibers as a reinforcing material in friction lining which are supposedly equivalent to asbestos linings but abrasion of the drum and lining is much lower. However, the delay values, particularly for increasing speed and increasing temperatures is inadequate for the greater demands. U.S. Pat. No. 4,130,537 describes a combination of aramide fibers and glass fibers as a reinforcing material for friction linings with better deceleration values but they also show a delay decrease at high temperatures and lining and drum wear rates are rather high.

OBJECTS OF THE INVENTION

It is an object of the invention to provide an asbestos-free friction material for friction linings having high delay values with low drum and lining wear rates, the said delay values being substantially constant both at different speeds and different drum temperatures or in several successive brakings.

It is a further object of the invention to provide improved brake linings.

These and other objects and advantages of the invention will become obvious from the following detailed description.

THE INVENTION

The novel asbestos-free friction material of the invention is comprised of 5 to 25% by weight of a hardenable binder or binder mixture, 1 to 70% by weight of a reinforcing fibrous material and conventional additives, the said reinforcing material consisting essentially of 2.5 to 12% by weight of aramide fibers, 6 to 25% by weight of mineral fibers and 16 to 36% by weight of steel fibers and optionally 5 to 20% by weight of powdered mica.

Friction linings made of the friction material of the invention have the desired advantages over conventional asbestos linings and the inhibition values are more evenly adjusted when the reinforcing materials contains 5 to 20% by weight of powdered mica, kaolin or wallastonite.

Friction linings made of the friction material of the invention are particularly suitable for the production of clutch- and brake-linings for passenger cars, trucks, and in the entire railroad sector due to their high wear-resistance and their high and uniform deceleration values. But they can be used in any technical area where elastic or rigid friction linings are required and the elasticity can be adjusted, depending on the requirements, by varying the binder used. Thus, the normally used hardenable polymers are suitable as binders, either alone or in combination with each other, such as phenol, epoxide or furan resins, and heat- and chemical-resisant natural and synthetic rubber like nitrile rubber or SBR rubber. The flexibility of a friction lining can be adjusted practically at will by using different rubber-resin ratios in the friction material.

Various fibers are used as a reinforcing material, each of which has certain properties. The use of these fibers in friction linings is known, but applicants' tests have shown that the properties of the respective type of fiber are not sufficient to be able to satisfy increased quality demands in friction linings. Only with the combination of the invention and with the ratios of the 3 types of fibers as in the invention, if necessary together with the amount of mica powder, kaolin or wallastonite, can the desired properties of the friction linings be obtained.

The aramide fibers consisting of aromatic polyamides derived from aromatic diamines and arylene dicarboxylic acids are highly thermally stable. Fibers with a decomposition point of at least 470° C. are preferred in the materials of the invention and such fibers are commercially available, e.g. under the name Arenka. They can be present in the form of fiber refuse in an amount of 2–12% by weight of the total mixture and the various fibers have a length of 1–60 mm, preferably 1–30 mm.

The addition of 6–25% by weight of mineral fibers, based on the weight of the total mixture, to the aramide fibers makes it possible to produce friction linings with higher deceleration values. But here too, a pronounced delay drop can be observed with increasing load on the friction lining. Examples of suitable mineral fibers in the friction materials are rock wool, slag wool, glass fibers, ceramic fibers or diabase fibers.

Diabase is a volcanic rock characterized by particular roughness and strength and this rock can be melted and spun into fibers from the melt whereby the length of the fiber can be varied. Fibers of 0.1–10 mm length can be used for the friction materials according to the invention, preferably, however, fibers of 0.1–1 mm length are used. Corresponding fibers are commercially available under the name "spinrock" and these fibers can be present in unoriented form as so-called fiber refuse.

Suitable as a metal fiber component in friction linings of the invention is steel fiber which is used as steel wool or fiber refuse. By the addition of 16–36% by weight of steel wool, based on the weight of the total mixture, to the friction material mixture, the wear of the corresponding friction lining, and also drum wear are clearly reduced. Moreover, the load capacity of the friction lining is substantially improved so that the friction lining has good and uniform delay properties over practically the entire load range. Only at extremely high temperatures is there a drop in delay and this drop can to a great extent be eliminated by the addition of 5–20% by weight (based on the total mixture) of a finely powdered reinforcement filler, like mica powder, kaolin or wallastonite to the friction material mixture. Surprisingly, the other properties of the corresponding friction lining are thus also slightly improved.

Apart from these principal components, other known fillers, lubricants and abrasives as well as hardening-agents or accelerators for the polymeric binder can be incorporated into the mixture.

For the production of the friction material according to the invention, it is advisable to open the entire fiber bond before it is mixed with the binder in a mixer, kneader or chopper. To increase the wetting capacity of the fibers with the binder, and thus to improve the bond, the fibers can be treated with an impregnating agent before they are used. Suitable impregnating agents are silanes, nitrile- and/or SBR rubber, phenol resins of the novolac- or resol-type, melamine resins or furan resins. The impregnation can be effected so that the fibers are saturated in a solution of the impregnating agent and subsequent dried, or that a corresponding master batch is provided in a mixer or kneader, consisting of the fibers and impregnating agents as is customary in the rubber industry. The novel method of the invention for producing a friction brake lining comprises mixing aramide fibers, mineral fibers and steel fibers with an impregnating agent, admixing the latter with a hardenable binder mixture, placing the resulting mixture in a mold and compressing the mixture to form a brake lining and hardening the same by heating.

In the following examples there are described several preferred embodiments to illustrate the invention. However, it is to be understood that the invention is not intended to be limited to the specific embodiments. In the examples, comparisons of the values of the friction material of the invention indicated as samples 3 and 4 are made with materials containing only aramide fibers (sample 1) or aramide fibers and mineral fibers (sample 2) as reinforcing materials.

EXAMPLE

The ingredients of Table I were throughly mixed in a kneader and the resulting mixture was granulated and placed in a mold and compressed at a pressure of 25 N/m$^2$ for varying periods of time depending on the desired thickness of the resulting friction lining. The residence time of the mixture in the mold was about 30 seconds per mm of lining thickness and the resulting linings were ground or milled to the desired size. The linings were then hardened in a recirculating furance at 150° to 200° C. for 3 to 12 hours depending on the friction lining thickness.

TABLE I

| Components (% by weight) | Sample No. | | | |
|---|---|---|---|---|
| | 1 | 2 | 3 | 4 |
| aramide fiber* | 10.00 | 3.50 | 3.50 | 3.50 |
| mineral fiber | — | 6.50 | 6.50 | 6.50 |
| steel wool | — | — | 28.00 | 24.00 |
| mica powder | — | — | — | 13.00 |
| iron(III)-oxide | 13.50 | 13.50 | 5.00 | 4.00 |
| magnesium oxide | 13.00 | 13.50 | 7.00 | 7.00 |
| talcum | 9.00 | 9.00 | 8.00 | 2.00 |
| calcium hydroxide | 10.00 | 10.00 | 6.00 | 6.00 |
| Thomas phosphate | 14.00 | 14.00 | 7.00 | 5.00 |
| cashew nutshell powder | 5.00 | 5.00 | 5.00 | 5.00 |
| plasticizer (hydrocarbon) | 1.00 | 1.00 | 1.00 | 1.00 |
| nitrile rubber | 13.00 | 13.00 | 13.00 | 13.00 |
| sulfur | 0.90 | 0.90 | 0.90 | 0.90 |
| zinc oxide | 0.70 | 0.70 | 0.70 | 0.70 |
| vulcanization accelerator | 0.40 | 0.40 | 0.40 | 0.40 |
| graphite | 3.00 | 3.00 | 1.50 | 1.50 |
| flame soot | 1.00 | 1.00 | 1.00 | 1.00 |

TABLE I-continued

| Components (% by weight) | Sample No. | | | |
|---|---|---|---|---|
| | 1 | 2 | 3 | 4 |
| phenol resin | 5.50 | 5.50 | 5.50 | 5.50 |

*Aramide fiber with a decomposition point of >470° C.

The friction linings were tested for their friction behavior and wear rate as disc or drum brake linings with an inertia dynamometer. All 4 friction linings before the test were subjected to a inertia dynamometer break-in at a maximum drum temperature of 100° C. until the linings had a contact reflection of 80% of the lining surface. After the bedding, the linings and the drum or disc were measured and weighed and the linings were tested as brake drum linings as follows:

The deceleration in m/sec$^2$ was determined as a function of the hydraulic pressure p at an initial speed of 80 km/h with an initial drum temperature of 60° C. at the beginning of each braking. The results are reported in Table II.

TABLE II

| Pressure (bar) | Deceleration in m/sec$^2$ Sample | | | |
|---|---|---|---|---|
| | 1 | 2 | 3 | 4 |
| 20 | 1.4 | 1.5 | 1.7 | 1.8 |
| 40 | 2.6 | 2.9 | 3.2 | 3.3 |
| 60 | 3.8 | 4.2 | 4.5 | 4.7 |
| 80 | 5.1 | 5.5 | 5.9 | 6.1 |

The deceleration in m/sec$^2$ was determined as a function of the hydraulic pressure p at an initial speed of 80 km/h with an initial drum temperature of 240° C. at the beginning of each braking. The results are reported in Table III.

TABLE III

| Pressure in bar | Deceleration in m/sec$^2$ | | | |
|---|---|---|---|---|
| | 1 | 2 | 3 | 4 |
| 20 | 1.2 | 1.3 | 1.4 | 1.7 |
| 40 | 2.2 | 2.4 | 2.7 | 3.2 |
| 60 | 3.3 | 3.6 | 3.6 | 4.5 |
| 80 | 4.6 | 4.8 | 5.1 | 6.0 |

The deceleration in m/sec$^2$ was determined as a function of the speed V at a constant hydraulic pressure of 60 bar and an initial drum temperature of 60° C. at the beginning of the test. The results are reported in Table IV.

TABLE IV

| V in km/h | Deceleration in m/sec$^2$ | | | |
|---|---|---|---|---|
| | 1 | 2 | 3 | 4 |
| 40 | 4.1 | 4.6 | 5.0 | 5.2 |
| 60 | 3.9 | 4.4 | 4.8 | 5.0 |
| 80 | 3.8 | 4.2 | 4.8 | 5.1 |
| 100 | 3.8 | 4.0 | 4.7 | 4.9 |
| 120 | 3.6 | 3.8 | 4.6 | 4.9 |
| 140 | 3.4 | 3.7 | 4.4 | 4.7 |

The deceleration in m/sec$^2$ was determined for 12 successive brakings made at 25 second intervals from a speed of 80 km/h and 40 bar hydraulic pressure. The results are reported in Table V.

TABLE V

| No. of Stops | Deceleration in m/sec$^2$ | | | |
|---|---|---|---|---|
| | 1 | 2 | 3 | 4 |
| 1 | 2.6 | 2.8 | 3.1 | 3.0 |

TABLE V-continued

| No. of Stops | Deceleration in m/sec² | | | |
|---|---|---|---|---|
| | 1 | 2 | 3 | 4 |
| 2 | 2.7 | 2.9 | 3.0 | 3.2 |
| 3 | 2.8 | 3.0 | 3.2 | 3.3 |
| 4 | 2.8 | 3.0 | 3.2 | 3.4 |
| 5 | 2.8 | 2.9 | 3.2 | 3.4 |
| 6 | 2.7 | 2.9 | 3.2 | 3.4 |
| 7 | 2.7 | 2.8 | 3.0 | 3.3 |
| 8 | 2.6 | 2.7 | 3.1 | 3.3 |
| 9 | 2.5 | 2.7 | 2.9 | 3.1 |
| 10 | 2.4 | 2.5 | 2.8 | 3.0 |
| 11 | 2.3 | 2.4 | 2.7 | 3.0 |
| 12 | 2.3 | 2.4 | 2.7 | 2.9 |

The deceleration in m/sec² was determined as a function of the hydraulic pressure p as in Table II and the results are reported in Table VI.

TABLE VI

| Pressure in bar | Deceleration in m/sec² | | | |
|---|---|---|---|---|
| | 1 | 2 | 3 | 4 |
| 20 | 1.4 | 1.5 | 1.7 | 1.7 |
| 40 | 2.5 | 2.8 | 3.1 | 2.4 |
| 60 | 3.6 | 4.0 | 4.4 | 4.9 |
| 80 | 4.9 | 5.2 | 5.9 | 6.3 |

The deceleration in m/sec² was determined as a function of the temperature T with an initial speed of 30 km/h and a pressure of 20 bar. The results are reported in Table VII.

TABLE VII

| Temperature °C. | Deceleration in m/sec² | | | |
|---|---|---|---|---|
| | 1 | 2 | 3 | 4 |
| 20 | 1.4 | 1.5 | 1.7 | 1.8 |
| 40 | 1.4 | 1.6 | 1.8 | 2.0 |
| 60 | 1.4 | 1.7 | 1.9 | 2.2 |
| 80 | 1.6 | 1.8 | 2.1 | 2.2 |
| 100 | 1.6 | 1.8 | 2.1 | 2.3 |
| 140 | 1.5 | 1.8 | 2.1 | 2.2 |
| 180 | 1.5 | 1.7 | 2.0 | 2.2 |
| 220 | 1.3 | 1.6 | 1.9 | 2.2 |
| 260 | 1.2 | 1.5 | 1.8 | 2.1 |
| 300 | 1.0 | 1.3 | 1.7 | 2.0 |

After the completion of the said tests, the brake linings and brake drums were measured and weighed. The tests were repeated again and the wear rate was determined as an arithmetic means of the two tests. The results are reported in Table VIII.

TABLE VIII

| | 1 | 2 | 3 | 4 |
|---|---|---|---|---|
| lining wear in g | 0.97 | 1.13 | 0.43 | 0.39 |
| drum wear in g | 0.1 | 1.4 | 0.2 | 0.2 |

The test results show that the linings 3 and 4 of the invention are superior to samples 1 and 2.

Various modifications of the linings of the invention may be made without departing from the spirit or scope thereof and it is to be understood that the invention is intended to be limited only as defined in the appended claims.

What we claim is:

1. An asbestos-free friction material comprising 5 to 25% by weight of a hardenable binder or binder mixture, 1 to 70% by weight of a reinforcing fibrous material and conventional additives, the said reinforcing material consisting essentially of 2.5 to 12% by weight of aramide fibers, 6 to 25% by weight of mineral fibers and 16 to 36% by weight of steel fibers and optionally 5 to 20% by weight of powdered mica.

2. The material of claim 1 containing 5 to 20% by weight of powdered mica, kaolin or wallastonite.

3. The material of claim 1 or 2 wherein the aramide fiber has a decomposition point higher than 470° C.

4. The material of claim 1, or 2 wherein the mineral fibers are selected from the group consisting of rock wool, slag wool, diabase fibers, ceramic fibers, glass fibers and mixtures thereof.

5. The material of claim 1 wherein the length of the mineral fibers is 0.1 mm to 10 mm.

6. The material of claim 5 wherein the mineral fiber length is 0.1 to 1 mm.

7. The material of claim 1 wherein the fibers are in the form of fiber refuse.

8. The material of claim 1 wherein the reinforcing fibers are treated with an impregnating agent.

9. The material of claim 8 wherein the impregnating agent is selected from the group consisting of silanes, epoxides, nitrile rubbers, SBR rubber, phenolic resins and furan resins.

* * * * *